United States Patent [19]

Edwards

[11] Patent Number: 5,544,480
[45] Date of Patent: Aug. 13, 1996

[54] AUGMENTOR LIGHT-OFF IMPROVEMENT

[75] Inventor: Thomas R. Edwards, Mason, Ohio

[73] Assignee: The United States of America as represented by the Secretary of the Air Force, Washington, D.C.

[21] Appl. No.: 269,296

[22] Filed: Jun. 30, 1994

[51] Int. Cl.⁶ .................................................. F02K 3/10
[52] U.S. Cl. .................................................. 60/243; 60/261
[58] Field of Search ........................... 60/243, 261, 734, 60/741

[56] References Cited

U.S. PATENT DOCUMENTS

| | | | |
|---|---|---|---|
| 2,978,870 | 4/1961 | Vdoviak | 60/741 |
| 3,690,094 | 9/1972 | McCombs, Jr. | 60/39.82 R |
| 3,760,590 | 9/1973 | Bader | 60/261 |
| 3,908,363 | 9/1975 | Bauerfeind | 60/237 |
| 4,128,995 | 12/1978 | Toot | 60/204 |
| 4,370,854 | 2/1983 | Williams | 60/261 |
| 4,825,649 | 5/1989 | Donnelly et al. | 60/261 |

*Primary Examiner*—Louis J. Casaregola
*Attorney, Agent, or Firm*—William G. Auton

[57] ABSTRACT

The disclosure describes a fuel scheduling system that controls the fuel into the pilot burner of an afterburner by making fuel flow directly proportional to compressor discharge pressure at low compressor pressures, but to limit fuel flow to a fixed value at high A/B pressures. This is accomplished by used of a fixed orifice trim in combination with a variable orifice inserted in the fuel tube for the afterburner.

18 Claims, 1 Drawing Sheet

5,544,480

AUGMENTOR LIGHT-OFF IMPROVEMENT

STATEMENT OF GOVERNMENT INTEREST

The invention described herein may be manufactured and used by or for the Government for governmental purposes without the payment of any royalty thereon.

BACKGROUND OF THE INVENTION

Many high performance gas turbine engines have a history of marginal afterburner (A/B) ignition performance. Afterburner (A/B) initiation faults have been experienced both on the ground and at altitude, particularly in the upper left hand corner of the engine operating envelope where the low pressure and temperature engine inlet conditions are not conducive for A/B initiation.

A prior system developed by the General Electric Company had a ram air supplied combustor which was swirl stabilized. The primary function was to achieve ignition within the pilot burner can and to subsequently propagate to the full A/B. Thus, the quickness and consistency of A/B ignition is directly dependent on the performance of the pilot burner can. The prior system is described in a paper entitled "Afterburner Ignition Improvement Package" by Thomas Edwards, et al, a copy of which is supplied with the Invention Disclosure Statement filed herewith, said paper being incorporated herein by reference. The present invention is a improvement over the prior system.

The prior invention worked well to eliminate A/B no-lights in the upper left hand corner of the flight envelope, however intermittent problems were experienced at take-off and mid-envelope conditions. These problems are due to an over-rich fuel schedule, which is fixed by this invention.

The prior art fuel schedule controls fuel into the pilot burner by making it directly proportional to compressor discharge pressure of the turbojet engine. Compressor discharge pressure is approximately proportional to A/B pressure. The final metering of fuel into the burner is accomplished within the ignitor fuel tube by a fixed orifice device. For high values of A/B pressure, the fuel injected into the burner potentially could exceed the rich limit resulting in slow or no light due to excessive richness. In accordance with this invention, a variable orifice such as a Lee "Flosert" is provided in conjunction with the fixed orifice to yield acceptable fuel flows at low A/B pressure, and to limit flow to a fixed value at high A/B pressure.

A search of the prior art revealed the following patents:

U.S. Pat. No. 4,128,995 issued to Toot;

U.S. Pat. No. 3,908,363 issued to Bauerfeind;

U.S. Pat. No. 3,760,590 issued to Bader; and

U.S. Pat. No. 3,690,094 issued to McCombs, Jr.

The Toot patent describes a method and apparatus for stabilizing an augmentor system. According to Toot, sensor devices measure temperature and pressures at critical points, and the measured values are compared to reference values. Any difference in the values indicates the proportional amount that the fuel flow is to be biased.

The Bauerfeind patent is directed to an aero gas turbine afterburner control system. The system includes an arrangement in which there is a direct mechanical or electrical connection between the thrust nozzle actuating mechanism and the afterburner fuel control unit. Such an arrangement provides for the degree of afterburning to be controlled as a function of the actual final discharge or exhaust area.

The Bader patent relates to a device for metering ignition fuel to the ignition unit of an afterburner associated with a turbojet engine. The device controls the injection time and/or the ignition fuel to the ignition unit of an afterburner associated with a turbojet engine. The device controls the injection time and/or the ignition fuel quantity as a function of the varying operating parameters of a turbojet engine under various ambient conditions. The device comprises pressure relief valves arranged and designed so that they ensure essentially the said rapid light-off or ignition of the afterburner under any operating condition as a function of the pressure of the high pressure fuel increasing or decreasing with higher or lower flight altitudes.

The McCombs, Jr. patent describes an afterburner fuel manifold flow sensor and igniter control apparatus. The apparatus comprises a flow restricting means in series flow relationship with the fuel supply conduit, a variable volume chamber and a metering restriction. Fluid pressure differential across the metering restriction is controlled by a varying device. In operation, the apparatus senses the rate of fuel flow into an afterburner fuel manifold, and energizes ignition apparatus for a predetermined time interval to ignite the afterburner fuel flow when the manifold is filled to a predetermined level.

SUMMARY OF THE INVENTION

In summary, this invention is an improvement over the afterburner design developed by the General Electric Company for its F110-GE-100 engines. The present invention provides a fuel schedule that controls the fuel into the pilot burner by making fuel flow directly proportional to turbojet engine compressor discharge pressure, at low A/B pressures, but limits fuel flow to a fixed value at high A/B pressures. This is accomplished by use of a fixed orifice trim in the fuel tube in combination with a variable orifice inserted in the fuel tube for the afterburner.

It is the object of this invention to provide a fuel schedule that controls the fuel into the pilot burner by making fuel flow directly proportional to compressor discharge pressure, at low A/B pressures, but to limit fuel flow to a fixed value at high A/B pressures.

BRIEF DESCRIPTION OF THE DRAWINGS

These and other advantages, objects and features of the invention will become more apparent after considering the following description taken in conjunction with the illustrative embodiment in the accompanying drawings, in which.

DESCRIPTION OF THE PREFERRED EMBODIMENT

Figure 1:
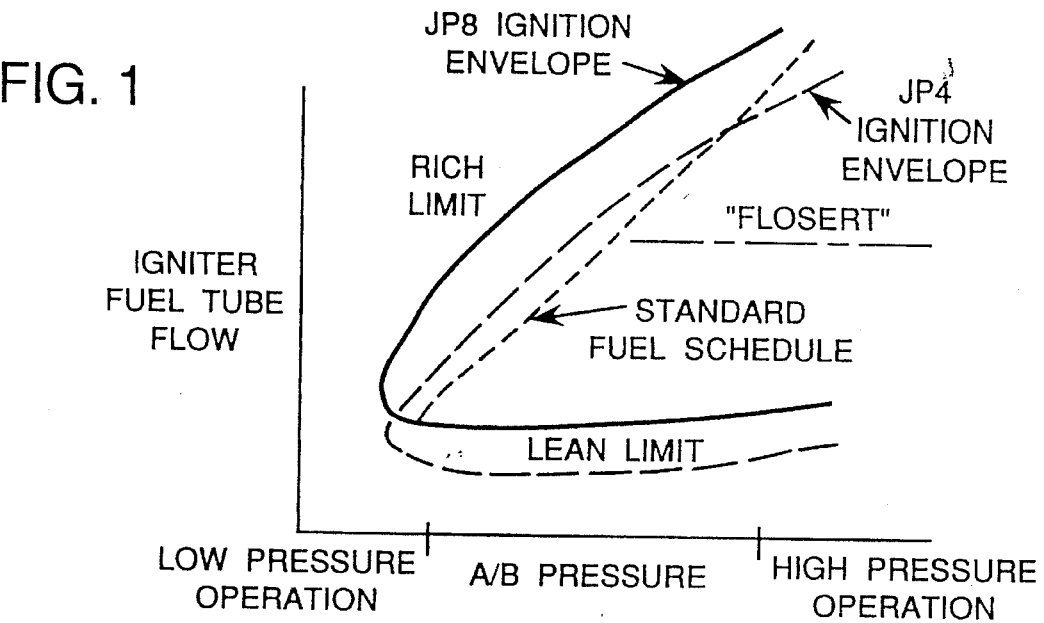
FIG. 1 presents curves showing the fixed orifice fuel schedule in relation to the burner ignition limits for the prior art system as compared with the present system.

The curves in FIG. 1 show the fuel flow characteristics of present invention as compared with the prior systems. It is a characteristic of the fuel control system that the inlet fuel pressure to the fuel tube assembly is made to be a function of the turbojet engine compressor discharge pressure. Turbojet engine compressor discharge pressure is proportional to A/B pressure. The standard schedule represents the fuel flow characteristics for a fuel tube assembly having a fixed orifice only. The ignition envelope for JP8 fuel is shown in solid line, while the ignition envelope for JP4 fuel is shown in dashed lines. JP4 and JP8 represent fuels having a wide range of volatilities which affect the rich and lean ignition limits. These are compared with the standard fuel schedule, in dotted line, where it is seen that with the use of this invention, the fuel schedules stay within-the envelope at all A/B pressures.

Figure 2:
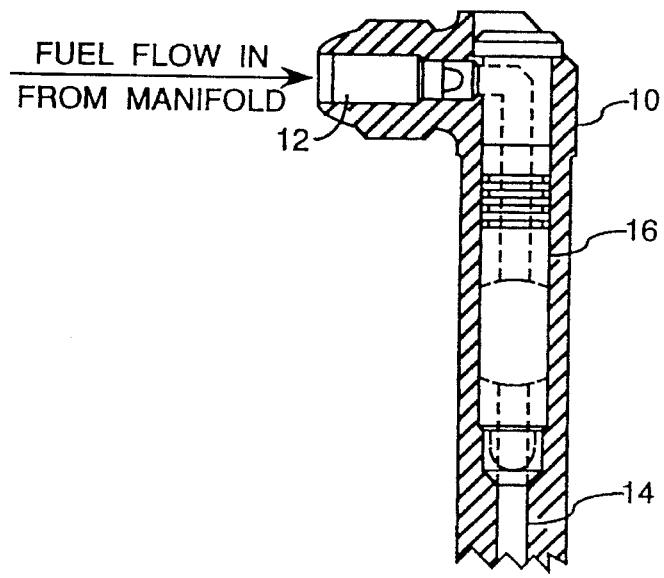
FIG. 2 is a sketch of the fuel tube assembly with a Lee "Flosert" variable flow device installed.

Referring to FIG. 2, the system for supplying fuel to the pilot burner can (not shown) comprises a flow tube assembly 10 into which fuel is metered by means of a fixed orifice 12. The fuel tube assembly 10 has a fuel injection tube 14 through which fuel flows to the pilot burner can. For operation at low afterburner pressure, the fuel flow is determined by the size of the fixed orifice 12, until such time that the afterburner pressure exceeds a predetermined design limit. At that point the flow is controlled by a variable orifice device 16, referred to herein as a Lee Flosert, installed within the fuel tube assembly 10.

Figure 3:
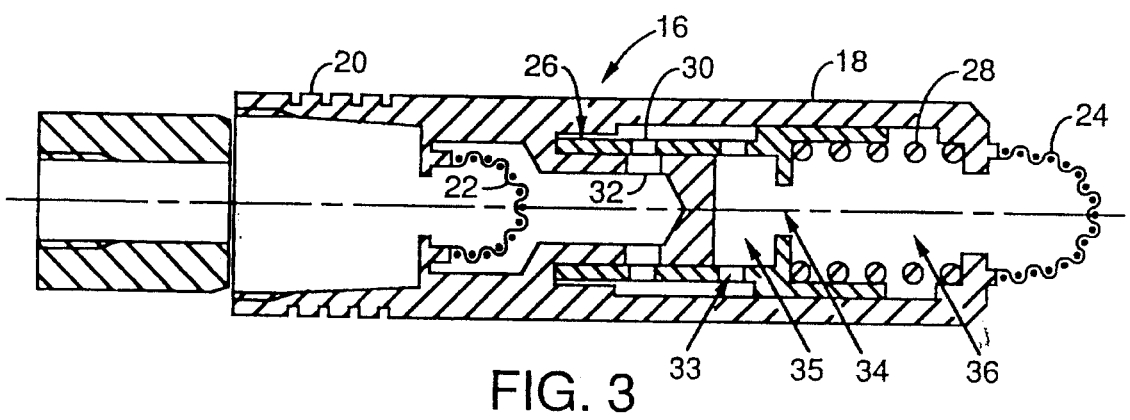
FIG. 3 shows details of the Flosert variable flow device.

The details of the variable orifice device (the Flosert) 16 are shown in FIG. 3, to which reference should be made. The Lee Flosert variable orifice device is a modification of a standard off-the-shelf device known by the trademark "Lee Flosert". Modifications are necessary to meet the flow specifications and tolerances required for this application. As seen in FIGS. 3, the valve assembly 16 is insertable into the fuel tube assembly, and secured by means of patented retention device 20. Fuel is filtered by means of screens 22 and 24, and fuel flow is regulated by means of a piston 26 which is spring biased by means of a spring 28. Normally, fuel to the pilot burner can flows radially outward through registering orifices 30 and 32, axially through the annulus formed by the valve body 18 bore and the piston 26 OD. The fuel then flows radially inward through orifice 33 which discharges into chamber 35 and axially through regulating orifice 34 which is located about the centerline of the piston 26. Fuel then flows to the discharge chamber 36 and exits the valve body 18. When the pressure in the chamber 35 exceeds a predetermined level, the piston moves to reduce the effective size of the registered orifices 30 and 32, to maintain a constant fuel flow, independent of A/B pressure, to maintain the pilot burner can within the operational ignition envelope.

Clearly, many modifications and variations of the present invention are possible in light of the above teachings and it is therefore understood, that within the inventive scope of the inventive concept, the invention may be practiced otherwise than specifically claimed.

What is claimed is:

1. A system for regulating the flow of fuel to a combustion chamber of an afterburner of a gas turbine engine, comprising:
    an in-line flow tube for delivering fuel to said afterburner, said flow tube having a permanently open inlet orifice for providing low pressure fuel therethrough and
    a variable device within said flow tube, said variable flow device having means responsive to pressure of the fuel being delivered for maintaining fixed flow through said orifice.

2. The system of claim 1, wherein said variable flow device includes a spring loaded piston with a sidewall orifice therein, said piston being displaced in response to pressure to maintain fixed flow of fuel through said tube.

3. The system of claim 2 wherein said piston has an apertured head and is responsive to an increase in pressure to maintain fixed flow of fuel through said tube.

4. The system of claim 1, wherein said variable flow device includes a spring-loaded piston, said piston being displaced in response to pressure to maintain fixed flow of fuel through said flow tube.

5. The system of claim 4 wherein said piston is responsive to an increase in pressure to maintain fixed flow of fuel through said flow tube.

6. A system for regulating fuel flow to a combustion chamber of a gas turbine afterburner having a prescribed ignition envelope for fuel flow plotted against afterburner pressure, comprising:
    means for increasing said fuel flow within said envelope with increasing afterburner pressure; and
    means for preventing said fuel flow from exceeding said envelope.

7. A system as defined in claim 6, wherein
    the increasing means comprises a fixed inlet orifice in a flow tube for delivering fuel to said afterburner, and
    the preventing means comprises a variable device in said flow tube.

8. A system as defined in claim 7, wherein
    said preventing means responds to the pressure of fuel flow through said inlet orifice to maintain said flow at a prescribed level.

9. A system as defined in claim 7, wherein said variable device includes a spring loaded piston receiving direct flow from said fixed inlet orifice.

10. The system of claim 9 wherein said piston is responsive to a unilateral increase in pressure to maintain said fixed flow of fuel through said tube.

11. The system of claim 6 for regulating fuel flow to a combustion chamber of a gas turbine afterburner having a prescribed fuel-flow envelope ranging from a lean-fuel limit to a rich-fuel limit, comprising:
    means for increasing said fuel flow with pressure for values above said lean-fuel limit, and
    means for maintaining said fuel flow at a prescribed level within said envelope for values below said rich-fuel limit.

12. A system for scheduling fuel into a gas turbine afterburner, comprising:
    means for preliminarily controlling the flow of said fuel into said afterburner by making said flow directly proportional to afterburner discharge pressure; and
    means for subsequently limiting said fuel flow to a substantially fixed flow value.

13. A system in accordance with claim 12 wherein said means for preliminarily controlling the flow of said fuel makes said flow directly proportional to afterburner discharge pressure at levels below the pressure where said fuel flow is confined to said substantially fixed value.

14. A system in accordance with claim 12 wherein said means for subsequently limiting said fuel flow to a substantially fixed value operates at a predetermined magnitude of pressure associated with relatively high afterburner pressures.

15. A system in accordance with claim 12 wherein the controlling means produces a substantially linear increase in igniter fuel tube flow for an increase in afterburner pressure.

16. The system of claim 1 wherein said variable device includes a spring-loaded and apertured piston which is displaced in response to pressure to maintain fixed flow of fuel through the aperture of said piston.

17. The system of claim 16 wherein the aperture of said piston comprises a regulating orifice responsive to an increase in pressure to maintain fixed flow of fuel through said tube.

18. The system of claim 9, wherein said spring loaded-piston has a body containing a plurality of orifices, a head extending from said body and containing a regulating orifice, a flange extending from said head and forming a cup for seating the spring that loads said piston; said variable device is axially positioned in said flow tube and has a plurality of orifices, an axial bore having an interior wall for containing said spring-loaded piston and a discharge chamber surrounded by said spring; said piston has one of its body orifices registrable with an orifice of said device for the radial flow of fuel to an axial passageway between said interior wall of said bore and said piston, then radially through another orifice in the body of said piston to its interior, then axially through said regulating orifice located in said head of said piston and exiting through said discharge chamber, said piston being displaced axially in response to pressure from said fixed inlet opening to maintain a fixed flow of fuel through said flow tube.

* * * * *